United States Patent [19]

Orr

[11] Patent Number: 4,657,145
[45] Date of Patent: Apr. 14, 1987

[54] INSPECTION APPARATUS

[75] Inventor: Thomas F. Orr, Whitehaven, England

[73] Assignee: British Nuclear Fuels plc, Warrington, England

[21] Appl. No.: 742,006

[22] Filed: Jun. 6, 1985

[30] Foreign Application Priority Data

Jun. 18, 1984 [GB] United Kingdom ............... 8415476

[51] Int. Cl.⁴ ........................... B07C 5/00; B07C 9/00
[52] U.S. Cl. .................................. 209/698; 209/549; 209/619; 209/627; 209/940
[58] Field of Search ............... 209/539, 546, 548, 549, 209/619, 625, 627, 628, 655, 658, 688, 698, 702, 942, 940, 907, 567, 606; 376/404, 450, 455, 903

[56] References Cited

U.S. PATENT DOCUMENTS

| | | | |
|---|---|---|---|
| 2,355,280 | 8/1944 | Dichter | 209/688 |
| 4,071,958 | 2/1978 | Morita et al. | 209/517 |
| 4,273,616 | 6/1981 | Andrews | 376/455 |
| 4,306,659 | 12/1981 | Hakoi | 209/688 |

FOREIGN PATENT DOCUMENTS 1057770 11/1983 U.S.S.R. ............................ 209/688

Primary Examiner—Robert B. Reeves
Assistant Examiner—Donald T. Hajec
Attorney, Agent, or Firm—William R. Hinds

[57] ABSTRACT

An elongate metal needle 23 is used to detect blockage in a throughbore in a nuclear fuel pellet 20 or other article. The pellets are fed along a tube 11 having a reject slot 30 and horseshoe magnets 14, 15. 14a, 15a support the needle in the pellet pass along the tube with the needle in the pellet bores. When a blockage is sensed, feed is interrupted and a switch 41 is operated to energize magnets 35 to rotate the tube 11 so that the defective pellet passes through slot 30 assisted by gravity operated reject element 33. Visual indicators 39, 40 are operated by flap 50, responsive to discharge of satisfactory pellets, to indicate a blockage has occurred.

14 Claims, 5 Drawing Figures

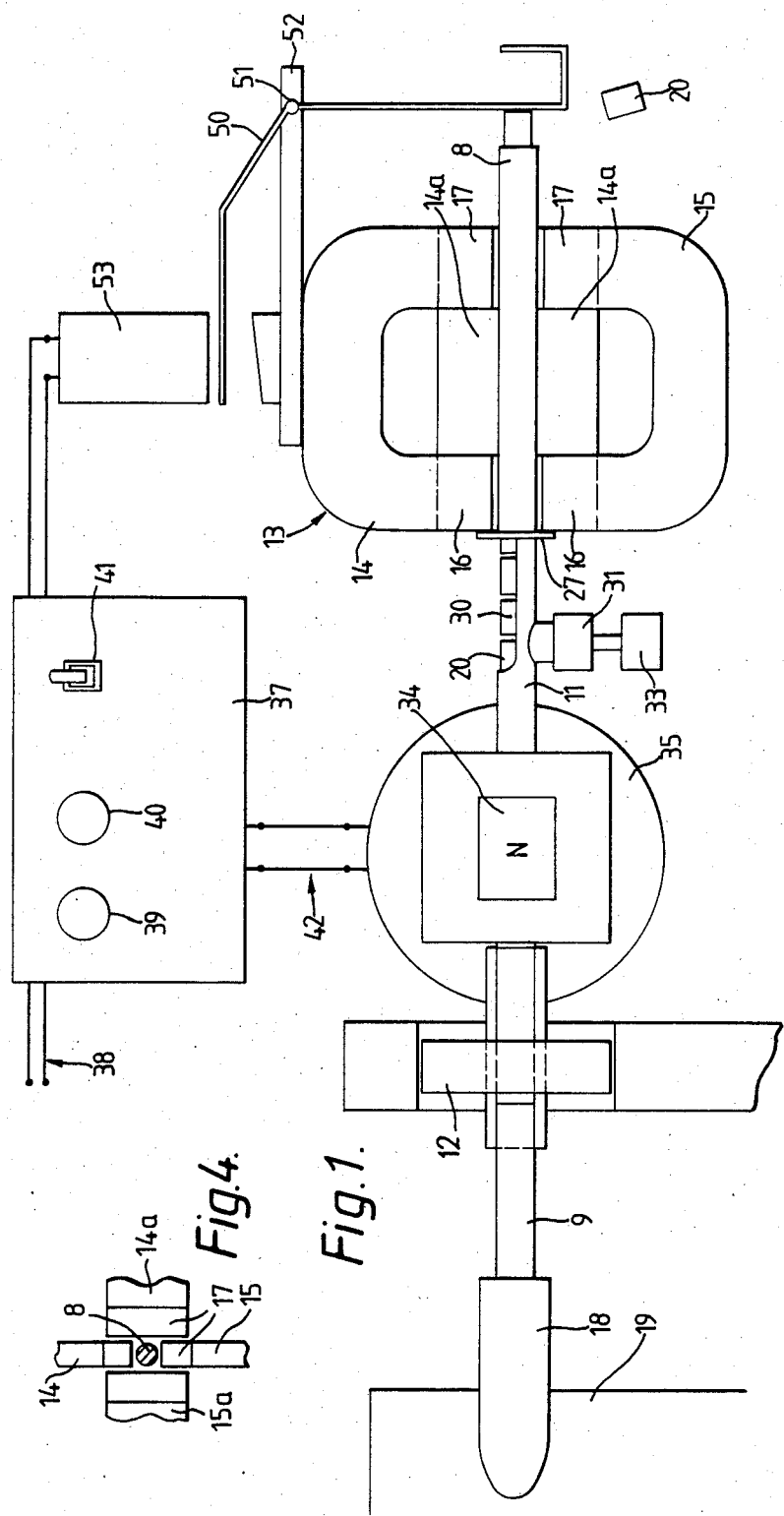

INSPECTION APPARATUS

This invention relates to inspection apparatus and is particularly but not exclusively related to inspection apparatus for use with nuclear reactor fuel pellets having a throughbore.

According to the invention inspection apparatus for articles having a throughbore comprises means for supporting an article to be inspected, an elongate inspection element, magnetic means for supporting the element for movement of the article along the element with the element in the throughbore, and means for rejecting the article if the element engages an obstruction in the throughbore.

The magnetic means may comprise pairs of opposed horseshoe magnets with like poles opposed. There may be two orthogonally disposed pairs.

The supporting means may comprise a tube along which articles can be fed in succession, the tube having a slot through which an article can be rejected.

Means may be provided for rotating the tube so that the article falls out through the slot.

The means for rotating the tube may comprise cooperable permanent and electromagnets.

The permanent magnet may be mounted on the tube.

The electromagnets may be energizable from a manually operable switch.

The apparatus may include a rejection element movable to assist movement of the article through the slot. The rejection element may comprise a pin movable under gravity relative to the tube.

Means may be provided for blocking the tube to prevent feed of the articles during rejection of an article.

Means may be provided for sensing when the inspection element meets an obstruction and providing a visual indication. The sensing means may be responsive to movement of articles along the article support means.

The article may be annular fuel pellets for a nuclear reactor.

The invention may be performed in various ways and one specific embodiment with possible modifications will now be described by way of example with reference to the accompanying drawings, in which:

FIG. 1 is a side elevation of an inspection apparatus;

FIG. 4 is a schematic axial view of the magnets.

The inspection apparatus 10 is for inspecting pellets of fuel for a nuclear reactor, for example, so-called breeder pellets for a fast breeder reactor.

In some cases the annular pellets have a throughbore and before use of the pellets it is necessary to check that the throughbore is present and unobstructed. A positive inspection is desirable, for example, using a needle since engagement of the inspection element with a blockage in the pellet produces restraint of movement of the pellet. A typical throuhbore is 1.5 mm diameter.

Figure 1A:
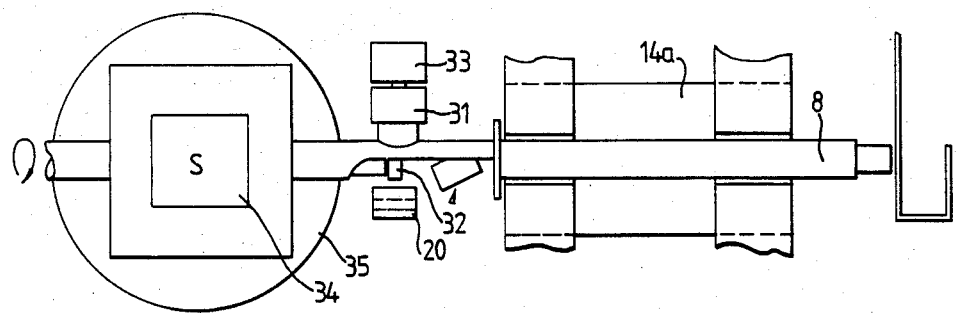
FIG. 1A shows part of FIG. 1 in another position

In the device of FIG. 1, a horizontal length 11 of tube, for example 17.5 cm long and 0.6 cm internal diameter, is supported near one end 9 by a ball race 12 and near the other end 8 by an arrangement 13 of four horseshoe permanent magnets, 14, 15, 14a, 15a. The magnets are arranged in two pairs, the magnets 14, 15 and 14a, 15a in each pair being coplanar having confronting like poles 16, 17 and the two pairs being in orthogonal planes. The like poles of all the magnets are adjacent.

Figure 2:
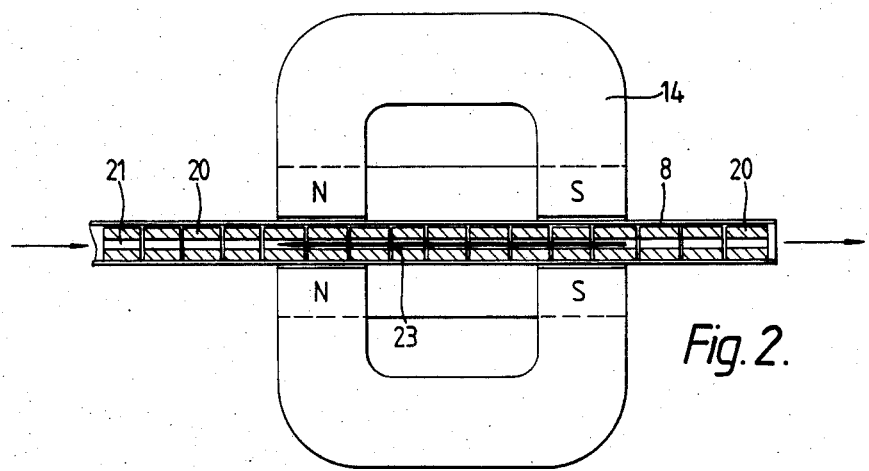
FIG. 2 is a diagrammatic showing of an inspection system.
Figure 3:
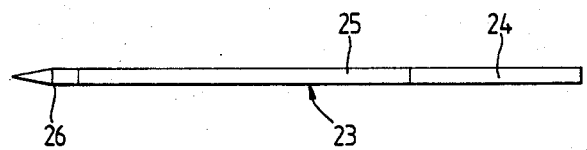
FIG. 3 is a side view of an elongate inspection pin.

The tube 11 can rotate on its longitudinal axis in the ball race and between the magnets. The tube end 9 is connected by a flexible tube 18 to a bowl feeder 19 from which pellets 20 are fed into the tube 11 until the pellets reach tube end 8. A throughbore is shown at 21. FIG. 2 shows a row of pellets 20. The tube end 8 is open. Supported by magnetism within the aligned bores 21 is a ferromagnetic needle or inspection element 23 which may, as shown in FIG. 3, be of uniform cross-section and for example have a non-magnetic stainless steel end portion 24, a ferromagnetic mild steel intermediate portion 25 and a non-magnetic stainless steel tip portion 26 which in use faces along the tube 11 towards the bowl feeder 19.

The tube 11 may have a collar 27 which abuts the magnets to locate the tube 11 axially.

The needle 23 is held axially outside the line of pellets 20 and on release is drawn by magnetic attraction into the aligned bores 21 to adopt a central position (FIG. 2) between the magnet poles. The needle 23 is magnetically held firmly in position with the inner ends of its non-magnetic ends 26, 24 between the respective N and S poles (FIG. 2), the end 26 protruding beyond the magnets to hold a defective pellet in position for rejection.

A rejection slot 20 is provided in part of the surface of tube 11 which is normally uppermost (FIG. 1) and below this slot is a gravity operated pin. A support 31 is fixed to the tube 11 and in this is slidable pin 32 carrying weight 33.

About mid-way along tube 11 is radially mounted a permanent bar magnet 34 held in a horizontal position by two axially spaced electromagnets 35 (only 1 shown in FIGS. 1, 1A) which are energized from a control box 37 having an AC supply 38 and having green and yellow indicators 39, 40, and a manually operable rejection switch 41. Operation of switch 41 in one sense reverses the polarity of DC output 42 from the control box to the electromagnets 35 to rotate the tube 11 and attached magnet 34 about the tube axis through 180° to the FIG. 1A position. Any pellets 20 in the rejection slot 30 fall out under gravity into a reject hopper and this is assisted by pin 32 which assisted by weight 33 falls into the slot 30. The pin 32 effectively blocks the tube 11 thus preventing further feed from feeder 19. After the pellets have thus been rejected, the switch 41 is operated in the opposite sense, the tube 11 and magnet 34 rotate back to the initial position (FIG. 1), the pin 32 falls out of the tube allowing feed of pellets to resume.

At the outlet end of the machine there is a gravity-operated metal flap 50 which is pivoted at 51 on structure 52 and has several functions.

i. It prevents the pellets 20 vibrating off the needle 23 when there are no pellets coming from the bowl feeder 19.

ii. It is a mechanical stop which prevents the needle 23 from being pushed out of the tube 11.

iii. It switches a metal detector 53 on and off as the pellets flip out of the machine. This is achieved by pivoting of angled flap 50 so as to move one end relative to the detector. This switching action operates two lamps 39, 40 which indicate the condition of the machine:

Green 39 and yellow 40 flashing alternately:

Pellets feeding
Yellow on steady: Blocked pellet
Green on steady (switch 41 operated):
Pellet rejected.

The inspection pin or needle 23 has a composite structure as mentioned above. The middle section is, (for example 0.16 cm diameter) mild steel, and at each end short pieces of stainless steel of the same diameter. The mild steel mid-section is located between the poles of the magnets, while the leading stainless steel end 26 ensures that a blocked pellet is held in the reject slot. The trailing stainless steel end 24 may be of a length to protrude from the exit end of the tube 11, which makes the pin 23 easily removable, supports the pellets 20 for the switching device and is a visual indication that the pin 23 is in position.

The magnetic machine has advantages:
i. Apart from the indicator flap 50, there are essentially no moving parts involved when the machine is inspecting good pellets. Pellets vibrate along the tube, pass over the pin 23 and fall from the machine at a rate of between 1 and 3 per second.
ii. The machine is quite compact and can be installed in places where space is limited.
iii. There is virtually no loss of feed path height; the pellets flow from the bowl feeder 19 horizontally through the tube 11 to be discharged at the same level.
iv. The pellets are substantially not liable to damage.
v. The machine will reject all types of blocked pellets from partially blocked to those with solid cores.
vi. It is physically impossible for a blocked pellet to pass through the machine.
vii. The machine will inspect over-diameter pellets up to an outside diameter approaching that of the tube 11 being used.
viii. The inspected pellet output can be either random or regimented into single file—bowl feed style.

The rejection mechanism is remotely but manually operated. In a modification the signals from the flashing lamps 39, 40 are used to actuate an automatic rejection system, with a manual override.

One or two good pellets may be rejected with the blocked pellet, dependent on the length of slot 30.

I claim:

1. Inspection apparatus for articles having a throughbore comprising means for supporting an article to be inspected, an elongate inspection element, magnetic means for supporting the element for movement of the article along the element with the element in the throughbore, and means for rejecting the article if the element engages an obstruction in the throughbore.

2. Apparatus as claimed in claim 1, in which the magnetic means comprises pairs of opposed horseshoe magnets with like poles opposed.

3. Apparatus as claimed in claim 2, in which there are two orthogonally disposed pairs of horseshoe magnets.

4. Apparatus as claimed in claim 1, in which the supporting means comprises a tube along which articles can be fed in succession, the tube having a slot through which an article can be rejected.

5. Apparatus as claimed in claim 4, including means for rotating the tube so that the article falls out through the slot.

6. Apparatus as claimed in claim 5, in which the rotating means comprises cooperable permanent and electro magnet means.

7. Apparatus as claimed in claim 6, in which a permanent magnet is mounted on the tube.

8. Apparatus as claimed in claim 6, in which the electromagnet means is energizable from a manually operable switch.

9. Apparatus as claimed in claim 4, including a rejection element movable to assist movement of the article through the slot.

10. Apparatus as claimed in claim 9, in which the rejection element comprises a pin movable under gravity relative to the tube.

11. Apparatus as claimed in claim 4, comprising means for blocking the tube to prevent feed of articles during rejection of an article.

12. Apparatus as claimed in claim 1, including means for sensing when the inspection element meets an obstruction and providing a visual indication.

13. Apparatus as claimed in claim 12, in which said sensing means is responsive to movement of articles along the article support means.

14. Apparatus as claimed in claim 1, in which the articles are nuclear fuel pellets for a nuclear reactor.

* * * * *